(12) United States Patent
Choi et al.

(10) Patent No.: US 8,010,828 B2
(45) Date of Patent: Aug. 30, 2011

(54) METHOD OF PROVIDING INTEROPERATIBILITY OF DIFFERENT NETWORK DEVICES CAPABLE OF ERROR HANDLING AND NETWORK DEVICE USING THE SAME

(75) Inventors: Moon Jeong Choi, Seoul (KR); Sang Do Park, Seoul (KR); Jun Hyeong Kim, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 1394 days.

(21) Appl. No.: 11/514,877

(22) Filed: Sep. 5, 2006

(65) Prior Publication Data

US 2007/0192460 A1     Aug. 16, 2007

(30) Foreign Application Priority Data

Jan. 31, 2006   (KR) .................. 10-2006-0009210

(51) Int. Cl.
*G06F 11/00* (2006.01)
(52) U.S. Cl. ........................ 714/4.1; 714/38.1
(58) Field of Classification Search .............. 714/4, 37, 714/38, 39, 40, 4.1, 38.1, 48; 717/124, 126, 717/128

See application file for complete search history.

(56) References Cited

U.S. PATENT DOCUMENTS

| | | | | |
|---|---|---|---|---|
| 6,111,953 A | * | 8/2000 | Walker et al. | 380/51 |
| 7,181,746 B2 | * | 2/2007 | Perycz et al. | 719/310 |
| 7,546,259 B1 | * | 6/2009 | Manton | 705/35 |
| 7,779,094 B2 | * | 8/2010 | Mahajan et al. | 709/221 |
| 2004/0163020 A1 | * | 8/2004 | Sidman | 714/100 |

FOREIGN PATENT DOCUMENTS

| | | |
|---|---|---|
| JP | 10-243045 | 9/1998 |
| JP | 11-069394 | 3/1999 |
| JP | 2001-127822 | 5/2001 |
| KR | 10-2001-0019840 | 3/2001 |
| KR | 10-2001-0019841 | 3/2001 |
| KR | 10-2004-045806 | 6/2004 |

* cited by examiner

*Primary Examiner* — Dieu-Minh Le
(74) *Attorney, Agent, or Firm* — NSIP Law

(57) ABSTRACT

A method and device of enabling interoperation between different devices over a network are provided. A control script corresponding to a service to be performed using device information received from a service providing device in a network is generated, the control script interoperating with the service providing device is executed, and when an error occurs during an execution of the control script, one routine of a plurality of handling routines is executed according to severity of the occurred error type. A suitable environment is established for interoperation with the service providing device as a result of having executed the one routine of the plurality of handling routines, when interoperation with the service providing device is possible.

26 Claims, 4 Drawing Sheets

METHOD OF PROVIDING INTEROPERATIBILITY OF DIFFERENT NETWORK DEVICES CAPABLE OF ERROR HANDLING AND NETWORK DEVICE USING THE SAME

CROSS-REFERENCE TO RELATED APPLICATIONS

This application claims the benefit under 35 U.S.C. § 119 (a) of Korean Patent Application No. 10-2006-0009210, filed Jan. 31, 2006, in the Korean Intellectual Property Office, the entire disclosure of which is hereby incorporated by reference.

BACKGROUND OF THE INVENTION

1. Field of the Invention

The present invention relates to middleware. More particularly, the present invention relates to a method of enabling ready and stable interoperation between different devices in a dynamic network environment and a network device using the method.

2. Description of the Related Art

Middleware consists generally of software connecting different servers and clients in a variety of computing environments. Also, in a narrow range of meaning, middleware consists of software bridging the difference between various types of hardware, network protocols, application programs, local area network (LAN) environments, personal computer (PC) environments and operating systems installed within a single company. Namely, middleware is software enabling smooth communication between an application program and an operating environment in complex heterogeneous networks.

With the popularization of super high speed Internet and development of short range wireless communication technology, interoperation between different devices is becoming increasingly important. For example, home network devices may have a need to interoperate with each other for proper execution.

In particular, when the properties of other devices are not known, network devices need to interoperate with other devices in a dynamic network environment, such as an ad hoc network. For example, when a user of an audio system within a home network purchases a new personal digital assistant (PDA) and takes the PDA home, the user may want to play an MP3 file stored in the PDA using the audio system. In such an installation, network devices frequently need to interoperate with each other without knowing the properties of other devices on the network.

When all network devices in a network support a particular protocol and interoperate with other devices in the network, interoperation between the network devices and the other devices may be enabled by setting the network devices to operate according to the particular protocol. However, in an ad hoc network environment where networked devices are more diversified and the platform or protocol of each device is different, devices not knowing the properties of other network devices may not readily interoperate with the other devices.

Accordingly, a method and device for enabling stable and effective interoperation between different network devices are needed.

SUMMARY OF THE INVENTION

Exemplary embodiments of the present invention provide a network device and method for ready and stable interoperation between different devices in a dynamic network environment.

Exemplary embodiments of the present invention provide a method and network device using the method which enables ready and effective interoperation between different devices without being limited by device type or system properties.

Exemplary embodiments of the present invention provide a method and a network device using the method which enables easy interoperation between different devices, thereby improving convenience of use.

Exemplary embodiments of the present invention provide a method and a network device using the method to dynamically expand a function necessary for interoperation by appropriately providing a service providing device with its necessary function expansion module, and to enable ready interoperation.

Exemplary embodiments of the present invention provide a method and a network device using the method which provides interoperation having a forward compatibility by enabling easy interoperation between a new device and existing devices.

Exemplary embodiments of the present invention provide a method and a network device using the method which effectively handles an error occurrence during an execution of a control script by interoperating with another device.

Exemplary embodiments of the present invention provide a method of interoperation between different devices on a network. The method includes generating a control script corresponding to a service to be performed using device information received from a service providing device, executing the control script by interoperating with the service providing device, executing at least one routine of a plurality of handling routines according to severity of error type when an error occurs during the execution of the control script, and establishing a suitable environment for interoperation with the service providing device for the service when an interoperation with the service providing device is possible, as a result of executing the at least one routine of the plurality of handling routines.

In an exemplary implementation, the control script can include more than one test code. Further, in an exemplary implementation, the executing the control script includes receiving a result of the test code execution in which the service providing device is included in the control script, and recognizing an error occurrence in the service providing during the test code execution.

In an exemplary implementation, the establishing a suitable environment for interoperation includes generating an updated control script according to the error type of the occurred error after the at least one routine of the plurality of handling routines is executed, executing the updated control script by interoperating with the service providing device, determining the interoperability with the service providing device corresponding to the service according to the error type in the execution of the updated control script, and establishing a suitable environment for interoperation with the service providing device for the service when the interoperation with the service providing device is possible. In an exemplary implementation, the updated control script can include an updated test code.

In an exemplary implementation, a routine corresponding to the most serious error type operates the service providing device in a passive control mode by obtaining a control of the service providing device.

In an exemplary implementation, the executing at least one routine of the plurality of routines selects, according to severity of error type, the at least one routine from the plurality of handling routines by referring to an error handling table stored in a handling guideline.

Exemplary embodiments of the present invention provide a network device. The network device includes a generating unit for generating a control script corresponding to a service to be performed using device information received from a service providing device in a network, a control script execution unit of the control script for executing the control script by interoperating with the service providing device, an error handling unit for executing at least one routine of a plurality of handling routines according to severity of error type when an error occurs during an execution of the control script, and an environment setup unit for establishing up a suitable environment for interoperation with the service providing device for the service when the interoperation with the service providing device is possible, as a result of executing the at least one routine of the plurality of handling routines.

In an exemplary implementation, the environment setup unit can include generating an updated control script according to the error type of the occurred error after the one routine of the plurality of handling routines is executed, interoperating with the service providing device according to the error type of the occurred error in an execution of the updated control script, and determining the interoperability with the service providing device relating to the service.

In an exemplary implementation, the network device can further include a function expansion module generation unit for generating, when requested, a function expansion module required by the service providing device executing the interoperation, and including the function expansion module in the control script and transmitting the control script to the service providing device.

In an exemplary implementation, the network can comprise an ad hoc network.

In an exemplary implementation, the function expansion module can comprise transmitted and received mobile code.

BRIEF DESCRIPTION OF THE DRAWINGS

The above and other exemplary features and advantages of the present invention will become more apparent from the following detailed description of certain exemplary embodiments thereof when taken in conjunction with the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
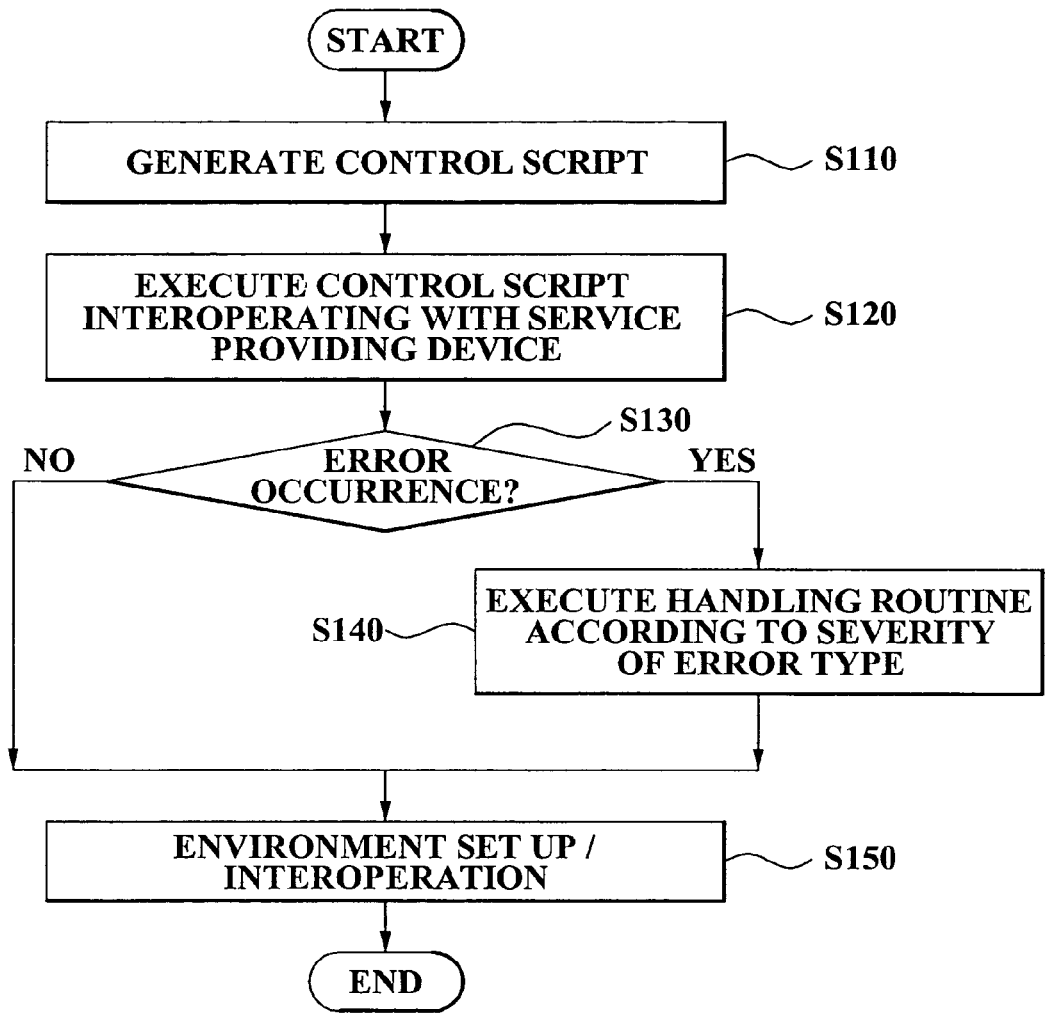
FIG. 1 is a flowchart illustrating a method of interoperation between different devices according to an exemplary embodiment of the present invention.

FIG. 1 is a flowchart illustrating a method of interoperation between different devices according to an exemplary embodiment of the present invention.

A method of interoperation between different devices according to an exemplary embodiment of the present invention includes executing interoperation required in a system level, establishing a background application which should be established prior to execution of an application, and preparing for the execution of the application in order to operate the application.

Referring to FIG. 1, the method of interoperation between different devices according to an exemplary embodiment of the present invention generates a control script relating to a service to be performed by using device information received from a service providing device in a network, step S110. The control script can include more than one test code. Also, when a serious error occurs, the control script may relay control of a remote control for a control device of a service providing device.

Through the control script, compiling and executing the test code, configuring the service providing device for operation of the test code, a path setup, executing a system service, operating a timer for handling a result of a test code execution, receiving the test code execution result, and status checking of a service providing device by referring to an error handling table may be executed.

Test codes comprise more than one type of executable code, and may be any one of a system test code, a compile test code, a performance test code, a reliability test code and a status check code.

A control device and a service providing device exchange device information through processes such as a service announcement and a service discovery. Through this exchange, the control device receives device information of the service providing device. Interoperation, such as the service announcement and service discovery described above, may be performed according to a Rendezvous protocol and a BEEP protocol.

The device information may include operating system information, system library information, Java Virtual Machine (JVM) information, memory information and language information and central processing unit (CPU) information of the device.

When device information is received from the service providing device, the control device may be determined with a service providing device and a service to be performed. For example, when the control device is a PDA and the service providing device is an MP3 player, the PDA may be manipulated to transmit an MP3 file to the MP3 player, which is the service providing device.

When the service providing device and the service to be performed are ascertained, a control script regarding the service to be performed is generated by using the device information received from the service providing device, step S110.

Further, the control script interoperating with the service providing device is executed, step S120.

The service providing device may transmit a test code execution result, which is included in the control script for the control device (FIG. 1). The control device may determine interoperability with the service providing device by using the received test code execution result. When the determination indicates that interoperation is not possible, the control device may generate a function expansion module required by the service providing device executing the interoperation, and transmit the control script including the function expansion module to the service providing device. The control device can then expand the function of the service providing device dynamically by using the function expansion module. The function expansion module can be a mobile code for dynamically expanding a function when the service providing device performs the corresponding service.

The mobile code can be executed in a remote location, and also may be easily executed independent of platform. Accordingly, when transmitting/receiving the function expansion module as a mobile code, the function may be dynamically expanded.

The mobile code may not be necessary every time. The necessity of the mobile code can be determined according to the result of the test code execution, which is performed in the service providing device. For example, whether the function expansion module can be generated may be determined by searching a table for a function expansion module corresponding to the result of the test code execution received from the service providing device. In an exemplary embodiment, the table can store every type of function expansion module.

When the test code execution results in a failure, the execution of the test code may be repeated at least a certain number of times while changing the test code for each repetition. The test code can be changed according to the test code execution result. In other words, after changing the test code according to error type when executing the test code in the service providing device, the steps of transmitting the test code and receiving the result of the test code execution can be repeated at least a certain number of times.

The method of interoperation between different devices can include recording the error in a database log and reporting the occurrence of the error when the error corresponding to the test code occurs more than a certain number of times. The date of the error, type of error, stage of the error, name of the service providing device, cause of the error, severity of the error type, status of the error type, and the like, may be recorded in the database log.

Further, the method of interoperation between different devices, according to the present exemplary embodiment, determines whether an error occurs during the execution of the control script interoperating with the service providing device, step S130.

The method of interoperation between different devices may determine whether the error has occurred during execution of the control script interoperating with the service providing device, such as when an error occurs during execution of the control script in the control device, when an error occurs during execution of the test code included in the control script in the service providing device and the like.

The method of interoperation between different devices may also determine an error has occurred when the execution of the test code included in the control script in the service providing device results in a failure.

A test code is transmitted to the service providing device, but a test code execution result may not be received therefrom even after a period of time passes. The result of the test code execution may be determined as a failure. This is to prevent the control device from waiting for a response from the service providing device, after transmission of the test code, when the service providing device cannot transmit the result of the test code execution since an error occurs in the service providing device.

As a result of the determination of step S130, when an error occurs during execution of the control script, interoperation between different devices according to an exemplary embodiment of the present invention executes at least one routine of a plurality of handling routines according to the severity of error type, step S140.

For example, the method of interoperation between different devices may include executing at least one routine of the plurality of routines, the at least one routine selected from the plurality of handling routines by referring to an error handling table stored in a handling guideline according to severity of error type. The error handling table can classify the severity of the error type according to a stage of the error occurring or cause of error, and the like, into a plurality of levels. The error handling table can also store the plurality of handling routines corresponding to each classified level of error type severity. That is, the plurality of handling routines may be stored as-is, and only a pointer to a memory location in which a handling routine has stored can be stored.

As a result of the determination of step S130, when an error does not occur during execution of the control script, an appropriate handling routine is executed in step S140 and interoperation between the control device and the service providing device is determined as possible. A suitable environment is then established for interoperation between the control device and the service providing device, step S150, and the service to be performed is executed.

The environment suitable for interoperation may be an environment in which the test code has been successfully executed.

Step S150 can include generating an updated control script according to the error type of the occurred error after the at least one routine of the plurality of handling routines is executed. Step S150 can also include executing the updated control script with the service providing device, determining the interoperability with the service providing device corresponding to the service according to the error type in the execution of the updated control script, and establishing a suitable environment for interoperation with the service providing device for the service to be performed when interoperation with the service providing device is possible.

According to an exemplary embodiment of the present invention, the appropriate control script and test code are also generated in a preparation of an application, the control script and test code are executed by interoperating the control device and the service providing device, and according to the result of the execution, a preparation of the necessary application for an appropriate service to be performed may be executed.

Figure 2:
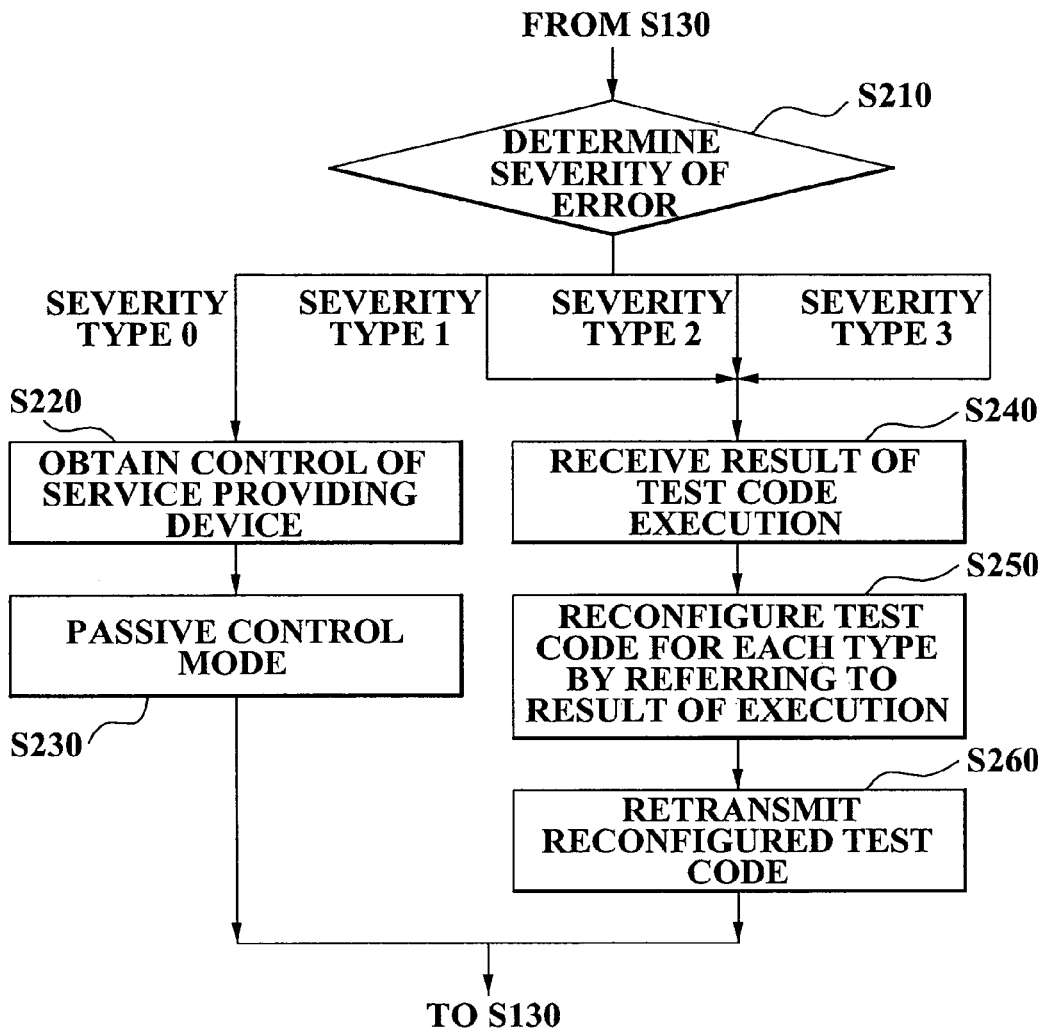
FIG. 2 is a flowchart illustrating an example of executing at least one routine from a plurality of handling routines illustrated in the exemplary embodiment of FIG. 1.

FIG. 2 is a flowchart illustrating an example of executing one routine from a plurality of handling routines illustrated in the exemplary embodiment of FIG. 1.

Referring to FIG. 2, in step S210, executing at least one routine from the plurality of routines S140 determines severity of error type of an error which has occurred. As a result of the determination in step S210, when the error type is a most serious type, that is, when the severity is, for example, type zero, executing at least one routine from the plurality of routines gains control of the service providing device, step S220.

The service providing device is then controlled in a passive control mode by the control device after gaining control of the service providing device, and a test code execution result is received from the service providing device, step S230.

As a result of the determination of step S210, when the error type is not the most serious type, that is, the severity is type 1, 2 or 3, executing at least one routine from the plurality of routines receives the test code execution result, step S240.

Further, in executing the at least one routine from the plurality of routines, the test code is reconfigured according to the execution result by referring to the received result of the test code execution, step S250.

The executing of at least one routine from the plurality of routines repeats transmission of the reconfigured test code to the service providing device and executes of the routine according to the result of the test code execution, step S260.

In the exemplary embodiment illustrated in FIG. 2, error types are classified into four types to be handled according to severity of error type, however, in other exemplary embodiments, error types can be classified into more than ten types, or less than four types, according to severity of error.

Figure 3:
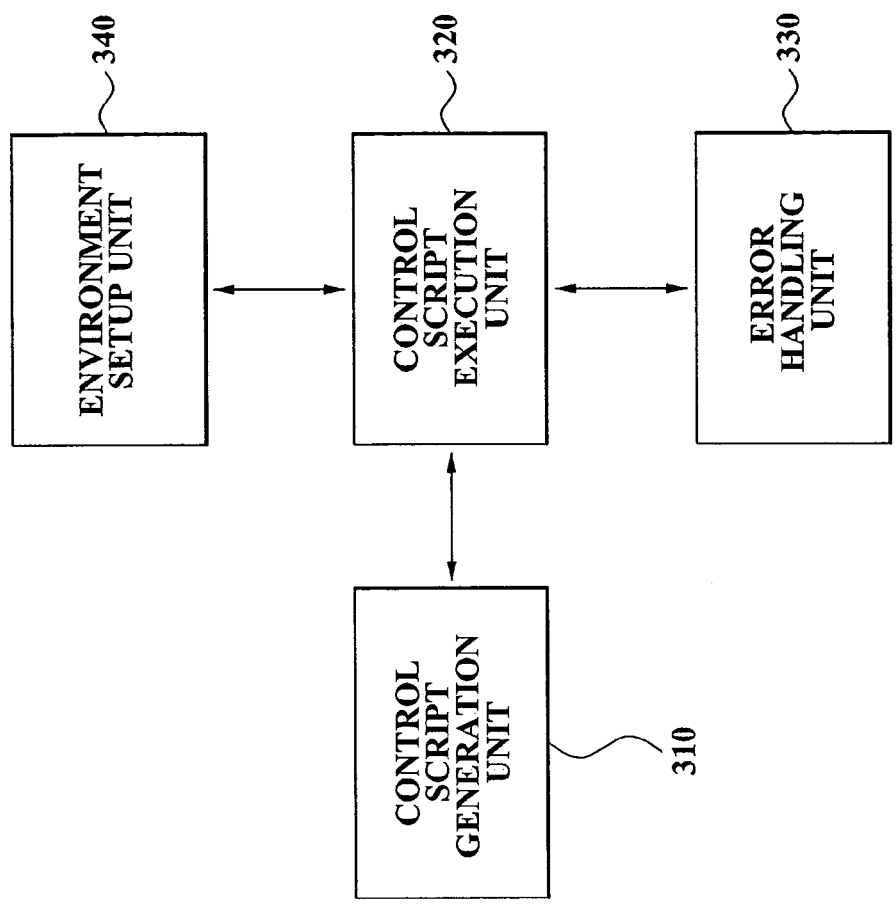
FIG. 3 is a block diagram illustrating a network device according to an exemplary embodiment of the present invention.

FIG. 3 is a block diagram illustrating a network device according to an exemplary embodiment of the present invention.

Referring to FIG. 3, a network device according to an exemplary embodiment of the present invention includes a control script generation unit 310, a control script execution unit 320, an error handling unit 330, and an environment setup unit 340. According to an exemplary embodiment of the present invention, the network device illustrated in FIG. 3 may further include a database log recording the occurrence of error. When, as a result of a test code execution, an error occurs more than a certain number of times, the network device may record the error in the database log and report the error.

The control script generation unit 310 generates a control script according to a service to be performed by using device information received from the service providing device.

The network can be an ad hoc network. Also, the device information received from the service providing device can be information obtained through a discovery process with respect to device information announced from the service providing device. Processes such as announcement and discovery can be performed according to a Rendezvous protocol, and the like.

The device information can include operating system information, system library information, JVM information, memory information, language information, and CPU information of the device.

The control script can include more than one test code. The control script execution unit 320 executes the control script by interoperating with the service providing device. The control script execution unit 320 receives a result of having executed the test code included in the control script, and recognizes the occurrence of an error in the service providing device when the test code is executed.

The error handling unit 330, when an error occurs during execution of the control script, executes at least one routine from a plurality of handling routines according to severity of error type.

The error handling unit 330, when the result corresponds to the most serious error type, operates the service providing device in a passive control mode by gaining control of the service providing device.

The error handling unit 330 selects, according to severity of error type, the at least one routine from the plurality of handling routines by referring to an error handling table stored in a handling guideline.

The environment setup unit 340 establishes an environment suitable for interoperation with the service providing device when interoperation with the service providing device is possible.

According to exemplary embodiments of the present invention, the network device generates a function expansion module required by the service providing device to execute the interoperation, and transmits the function expansion module to the service providing device with the function expansion module included in the control script, the service providing device being subsequently expanded dynamically by a function by using the function expansion module.

The network device illustrated in FIG. 3 can determine a test code execution result as a failure when the result of the test code execution is not received from the service providing device after a period of time passes.

Figure 4:
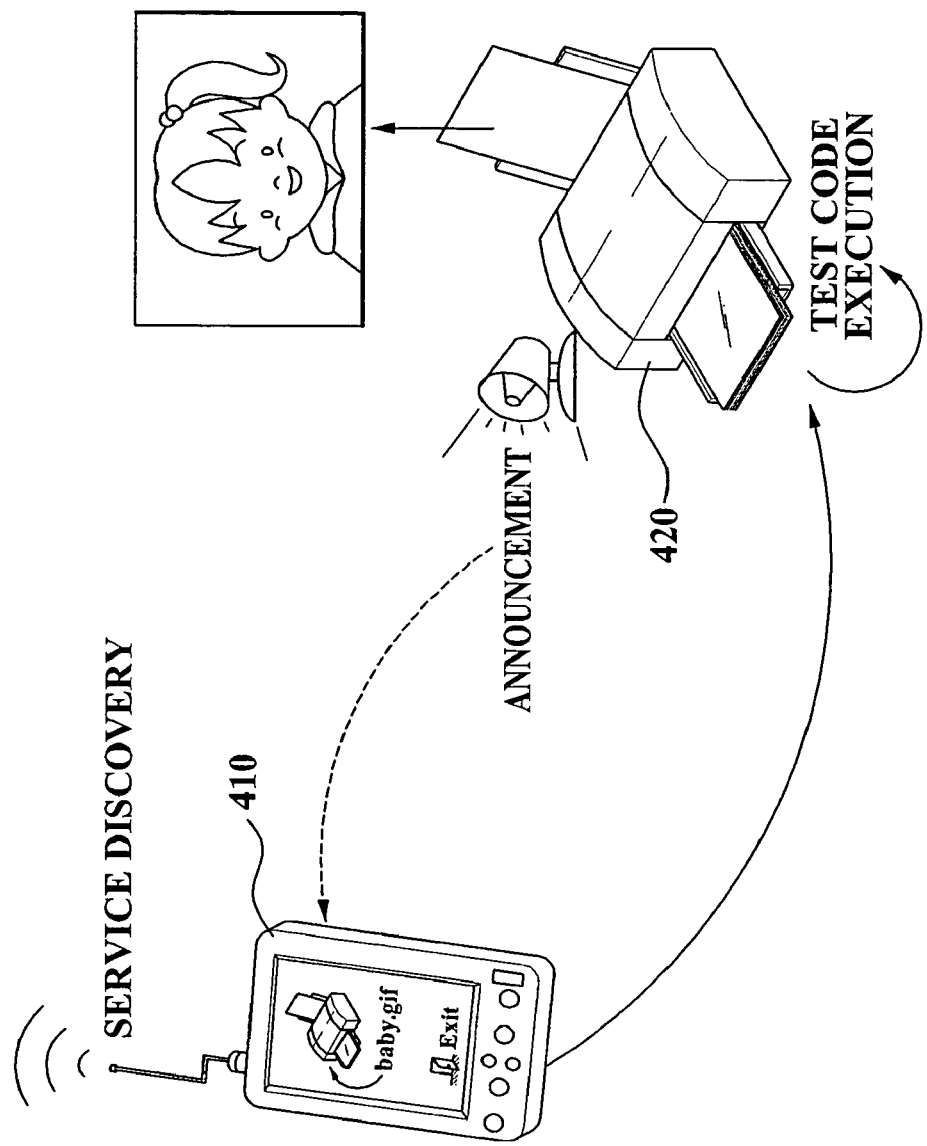
FIG. 4 is a diagram illustrating operation of interoperation between a personal data assistant (PDA) and a photo printer in accordance with an exemplary embodiment of the present invention.

FIG. 4 is a diagram illustrating interoperation between a PDA 410 and a photo printer 420 in accordance with an exemplary embodiment of the present invention. Referring to FIG. 4, a PDA 410 enables a user to output a picture file to a photo printer 420 received from the PDA 410 by discovering a service announcement of the photo printer 420. The PDA 410 may be manipulated to select a service for outputting the picture file to the photo printer 420.

When the user selects the service of outputting the picture file to the photo printer 420, the PDA 410 generates a test code by using device information of the photo printer 420 and device information of the PDA 410, and the selected service information. The test code is utilized for testing whether a function of interoperating with the PDA 410 may be performed in the photo printer 420. A test code may be generated according to device properties of the photo printer 420 or the PDA 410, or according to a service type selected by the user.

When the test code is generated, the PDA 410 transmits the test code to the photo printer 420. The photo printer 420 receives and executes the test code, and transmits a result of the execution of the test code to the PDA 410.

When interoperation between the PDA 410 and the photo printer 420 is possible, the PDA 410 establishes an environment suitable for interoperation with the photo printer 420. Further, the PDA 410 enables the user to select a picture file, baby.gif for example, for outputting to the photo printer 420.

After the user selects the picture file, baby.gif in this example, the photo printer 420 receives and prints the selected picture file.

Operations of interoperating network devices according to the present exemplary embodiment have been described with reference to FIG. 4. However, according to exemplary embodiments, when the execution of a test code results in a failure, the PDA 410 may transmit to the photo printer 420 a function expansion module when the photo printer 420 interoperates with the PDA 410. Through this interoperation, the PDA 410 enables the photo printer 420 to dynamically expand a function. Further, when the test code is transmitted to the photo printer 420 but no response is received after a period of time, the PDA 410 may determine that execution of the test code is a failure. When execution of the test code is determined as a failure, the PDA 410 may repeat transmitting a test code and receiving a result of the test code execution at least a certain number of times, and changing the test code for each repetition.

According to exemplary embodiments of the present invention, it is possible to secure ready and flexible interoperation between different devices not knowing each other's properties.

Also, according to exemplary embodiments of the present invention, it is possible to enable ready and effective interoperation between different devices without being limited by the type of device or system properties.

Also, according to exemplary embodiments of the present invention, it is possible to enable easy interoperation between different devices without user manipulation, thereby improving the convenience of use.

Also, according to exemplary embodiments of the present invention, it is possible to dynamically expand a function for interoperation by appropriately providing a service providing device with its function expansion module, and to enable ready interoperation.

Also, according to exemplary embodiments of the present invention, it is possible to handle an error occurrence during operation of an execution by interoperating with another device.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims and equivalents thereof.

What is claimed is:

1. A method of interoperation between devices, the method comprising:
   generating, at a network device, a control script corresponding to a service to be performed;
   executing, at a service providing device, the control script by interoperating with the service providing device;
   executing at least one routine of a plurality of handling routines according to severity of error type when an error occurs during the execution of the control script; and
   establishing an environment for facilitating interoperation with the service providing device as a result of the executing of the at least one routine of the plurality of handling routines.

2. The method of claim 1, wherein the establishing of the environment for facilitating the interoperation comprises:
   generating an updated control script according to the error type after the at least one routine of the plurality of handling routines is executed;
   executing the updated control script by interoperating with the service providing device;
   determining the interoperability with the service providing device corresponding to the service to be performed according to the error type in the execution of the updated control script; and
   establishing the environment for facilitating the interoperation with the service providing device for the service to be performed.

3. The method of claim 1, wherein the executing of the control script comprises:
   receiving a test code execution result, the control script in the service providing device comprising the test code execution result; and
   recognizing an occurrence of an error in the service providing device during the test code execution.

4. The method of claim 3, further comprising:
   recording the error in a database log; and
   reporting the occurrence of the error when the error corresponding to the test code occurs more than a certain number of times.

5. The method of claim 1, wherein the plurality of handling routines includes a routine that operates the service providing device in a passive control mode by gaining control of the service providing device when the result corresponding to the most serious error type occurs.

6. The method of claim 3, wherein the executing of the control script comprises determining the test code execution result as a failure when the test code execution result is not received from the service providing device for a period of time.

7. The method of claim 1, wherein the executing of the at least one routine of the plurality of routines comprises selecting, according to the severity of the error type, the at least one routine from the plurality of handling routines by referring to an error handling table stored in a handling guideline.

8. The method of claim 1, further comprising:
   generating a function expansion module required by the service providing device executing the interoperation;
   including the function expansion module in the control script; and
   transmitting the control script to the service providing device.

9. The method of claim 1, wherein an ad hoc network comprises the service providing device.

10. The method of claim 1, wherein the control script is generated using device information received from a service providing device in a network.

11. A network device comprising:
    a generating unit for generating a control script corresponding to a service to be performed;
    a control script execution unit for executing the control script at a service providing device and interoperating with the service providing device;
    an error handling unit for executing at least one routine of a plurality of handling routines according to severity of error type when an error occurs during the execution of the control script; and
    an environment setup unit for establishing an environment facilitating for interoperation with the service providing device for the service to be performed, as a result of the executing of the at least one routine of the plurality of handling routines.

12. The network device of claim 11, wherein the environment setup unit comprises:
    a means for generating an updated control script according to the error type after the at least one routine of the plurality of handling routines is executed;
    a means for interoperating with the service providing device according to the error type in an execution of the updated control script, and
    a means for determining the interoperability with the service providing device relating to the service to be performed.

13. The network device of claim 11, wherein the control script execution unit receives a test code execution result included in the control script and recognizes the error in the service providing device during the test code execution.

14. The network device of claim 13; further comprising:
    a database log recording the error,
    when the error occurs as the result of the test code execution at least a certain number of times.

15. The network device of claim 14, wherein the error is reported.

16. The network device of claim of 13, wherein the control script execution unit determines the result of the test code execution-as a failure when the test code execution result is not received from the service providing device for a period of time.

17. The network device of claim 11, wherein the error handling unit, when the at least one routine corresponds to the most serious error type, operates the service providing device in a passive control mode by gaining control of the service providing device.

18. The network device of claim 11, wherein the error handling unit selects the one routine from the plurality of handling routines according to severity of error type by referring to an error handling table stored in a handling guideline.

19. The network device of claim 11, further comprising:
a function expansion module generation unit for generating a function expansion module required by the service providing device executing the interoperation, wherein the function expansion module is included in the control script and the control script is transmitted to the service providing device.

20. The network device of claim 11, wherein the network includes an ad hoc network.

21. The network device of claim 11, wherein the control script is generated using device information received from a service providing device in a network.

22. A computer readable medium having stored thereon instructions for interoperation between devices, the instructions comprising:
a first set of instructions for generating, at a network device, a control script corresponding to a service to be performed;
a second set of instructions for executing, at a service providing device, the control script by interoperating with the service providing device;
a third set of instructions for executing at least one routine of a plurality of handling routines according to severity of error type when an error occurs during the execution of the control script; and
a fourth set of instructions for establishing an environment for facilitating interoperation with the service providing device as a result of the executing of the at least one routine of the plurality of handling routines.

23. The instructions of claim 22, wherein the fourth set of instructions for establishing of the environment for interoperation comprise:
a set of instructions for generating an updated control script according to the error type after the at least one routine of the plurality of handling routines is executed;
a set of instructions for executing the updated control script by interoperating with the service providing device;
a set of instructions for determining the interoperability with the service providing device corresponding to the service to be performed according to the error type in the execution of the updated control script; and
a set of instructions for establishing the environment for facilitating the interoperation with the service providing device for the service to be performed.

24. The instructions of claim 22, wherein the second instructions for executing of the control script comprise:
a set of instructions for receiving a test code execution result, in the control script in the service providing device comprising the test code execution result; and
a set of instructions for recognizing an occurrence of an error in the service providing device during the test code execution.

25. The instructions of claim 24, further comprising:
a fifth set of instructions for recording the error in a database log; and
a sixth set of instructions for reporting the occurrence of the error when the error corresponding to the test code occurs more than a certain number of times.

26. The instructions of claim 22, further comprising:
a seventh set of instructions for generating a function expansion module required by the service providing device executing the interoperation;
an eighth set of instructions for including the function expansion module in the control script; and
a ninth set of instructions for transmitting the control script to the service providing device.

* * * * *